United States Patent
Keller et al.

(10) Patent No.: US 11,544,230 B2
(45) Date of Patent: Jan. 3, 2023

(54) CROSS ENVIRONMENT UPDATE OF CLOUD RESOURCE TAGS

(71) Applicant: CITRIX SYSTEMS, INC., Burlington, MA (US)

(72) Inventors: Steven A. Keller, Coral Springs, FL (US); Sindy Giraldo, Deerfield Beach, FL (US); Stephan Vanwoezik, Boynton Beach, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 93 days.

(21) Appl. No.: 16/909,401

(22) Filed: Jun. 23, 2020

(65) Prior Publication Data
US 2021/0397588 A1    Dec. 23, 2021

(51) Int. Cl.
G06F 17/00    (2019.01)
G06F 7/00    (2006.01)
G06F 16/185    (2019.01)
H04L 67/10    (2022.01)
G06F 16/903    (2019.01)

(52) U.S. Cl.
CPC ...... G06F 16/185 (2019.01); G06F 16/90335 (2019.01); H04L 67/10 (2013.01)

(58) Field of Classification Search
CPC ... G06F 16/185; G06F 16/90335; H04L 67/10
USPC ...................................................... 707/610
See application file for complete search history.

(56) References Cited

U.S. PATENT DOCUMENTS

| | | | |
|---|---|---|---|
| 8,886,598 B1 * | 11/2014 | Emigh | H04N 21/47 707/620 |
| 2006/0248123 A1 * | 11/2006 | Butash | G06F 11/0751 |
| 2007/0064711 A1 * | 3/2007 | Wang | G06F 3/0605 370/395.4 |
| 2009/0276771 A1 * | 11/2009 | Nickolov | H04L 67/1008 718/1 |
| 2011/0161973 A1 * | 6/2011 | Klots | H04M 15/00 707/705 |
| 2012/0198073 A1 * | 8/2012 | Srikanth | H04L 67/10 709/226 |
| 2015/0205830 A1 * | 7/2015 | Bastide | G06F 16/951 707/758 |
| 2017/0048176 A1 * | 2/2017 | Onusko | H04L 51/046 |

(Continued)

*Primary Examiner* — Pavan Mamillapalli
(74) *Attorney, Agent, or Firm* — Mintz Levin Cohn Ferris Glovsky and Popeo, P.C.

(57) ABSTRACT

A method for updating cloud resource tags is provided. The tag associated with a cloud resource may assign the cloud resource to one or more categories to enable tracking of the cloud resource. The method may include determining, based on a synchronization profile, the scope of the update. For example, the scope of the update may encompass individual resources, groups of resources, and/or subscriptions. A metadata data store may be queried to retrieve mapping rules corresponding to tags of resources from one or more cloud service providers that are within the scope of the update. If the value of a tag does not match the value specified by the corresponding mapping rule, the value of the tag may be updated to match the value specified by the mapping rule. Related systems and articles of manufacture, including computer program products, are also provided.

21 Claims, 8 Drawing Sheets

(56) References Cited

U.S. PATENT DOCUMENTS

2017/0093753 A1\* 3/2017 Summers .............. H04L 47/808
2017/0243131 A1\* 8/2017 Kephart ................. G06F 16/00

\* cited by examiner

| Tag | Stored Procedure | Filter Parameters | TagValueInColumn | Default |
|---|---|---|---|---|
| CostCenter | csp_GetAccountTagMap | Platform, AccountId, SubAccountId Aws, 411570889952, 89480528626 | Cost_Center | unknown |

FIG. 2

CROSS ENVIRONMENT UPDATE OF CLOUD RESOURCE TAGS

TECHNICAL FIELD

The subject matter described herein relates generally to cloud computing and more specifically to the updating of cloud resource tags across multiple cloud computing environments.

BACKGROUND

Cloud computing can include the on-demand availability of a pool of shared computing resources, such as computer networks, server, data storage, software applications, and services, without direct active management by the user. The term can be generally used to describe data centers available to many users over the Internet. Large clouds often have functions distributed over multiple locations from central servers.

Some cloud computing providers can allow for scalability and elasticity via dynamic (e.g., "on-demand") provisioning of resources on a fine-grained, self-service basis. This can provide cloud computing users the ability to scale up when the usage need increases or down if resources are not being used.

SUMMARY

Methods, systems, and articles of manufacture, including computer program products, are provided for updating resource tags across multiple cloud computing environments. In one aspect, there is provided a system including at least one data processor and at least one memory. The at least one memory may store instructions that result in operations when executed by the at least one data processor. The operations can include: querying a metadata data store to retrieve first mapping rule corresponding to a first tag associated with a first resource from a first cloud service provider, the first tag assigning the first resource to one or more categories; determining whether a first value of the first tag matches a second value specified by the first mapping rule; and in response to determining that the first value of the first tag does not match the second value specified by the first mapping rule, update the first value of the tag to match the second value specified by the first mapping rule.

In some variations, one or more of the features disclosed herein including the following features can optionally be included in any feasible combination. A scope of an update may be determined based at least on a synchronization profile. The metadata data store may be queried to retrieve the first mapping rule and a second mapping rule within the scope of the update.

In some variations, the synchronization profile may define the scope of the update to include one or more tags associated with one or more cloud resources, groups of resources, and/or subscriptions.

In some variations, whether a third value of a second tag matches a fourth value specified by the second mapping rule may be determined. The second tag may be associated with a second resource from the first cloud service provider or a second cloud service provider. The second tag may assign the second resource to the one or more categories. In response to determining that the third value of the second tag does not match the fourth value specified by the second mapping rule, the third value of the second tag may be updated to match the fourth value specified by the second mapping rule.

In some variations, a first cost of the first resource and a second cost of the second resource may be tracked based at least on the first tag and the second tag.

In some variations, whether the first value of the first tag matches the second value specified by the first mapping rule may be determined by interacting with an application programming interface (API) of the first cloud service provider.

In some variations, the first value of the first tag may be updated to match the second value specified by the first mapping rule by interacting with an application programming interface (API) of the first cloud service provider.

In some variations, the one or more categories may include a deployment environment, a cost center, an application, a compliance requirement, an owner, a contact person, a team, a budget, and/or an optimization schedule.

In some variations, a request to update the first value to the first tag to the second value may be received from a client. The first mapping rule may be modified in response to the request.

In some variations, the first value of the first tag may be updated to the second value in response to a change to a product including the first cloud resource.

In some variations, the first value of the first tag may be updated to the second value in response to the first cloud resource being reconfigured for a different consumer.

In some variations, the metadata data store may be queried by at least executing a stored procedure. The stored procedure may be stored at the metadata data store. The stored procedure may include one or more database statements configured to retrieve, from the metadata data store, the second value specified by the first mapping rule corresponding to the first tag.

In another aspect, there is provided a method for updating resource tags across multiple cloud computing environments. The method may include: querying a metadata data store to retrieve first mapping rule corresponding to a first tag associated with a first resource from a first cloud service provider, the first tag assigning the first resource to one or more categories; determining whether a first value of the first tag matches a second value specified by the first mapping rule; and in response to determining that the first value of the first tag does not match the second value specified by the first mapping rule, update the first value of the tag to match the second value specified by the first mapping rule.

In some variations, one or more of the features disclosed herein including the following features can optionally be included in any feasible combination. The method may further include: determining, based at least on a synchronization profile, a scope of an update, the synchronization profile defining the scope of the update to include one or more tags associated with one or more cloud resources, groups of resources, and/or subscriptions; and querying the metadata data store to retrieve the first mapping rule and a second mapping rule within the scope of the update.

In some variations, the method may further include: determining whether a third value of a second tag matches a fourth value specified by the second mapping rule, the second tag associated with a second resource from the first cloud service provider or a second cloud service provider, the second tag assigning the second resource to the one or more categories; and in response to determining that the third value of the second tag does not match the fourth value specified by the second mapping rule, updating the third value of the second tag to match the fourth value specified by the second mapping rule.

In some variations, the method may further include: interacting with an application programming interface (API) of the first cloud service provider to determine whether the first value of the first tag matches the second value specified by the first mapping rule.

In some variations, the method may further include: interacting with an application programming interface (API) of the first cloud service provider to update the first value of the first tag to match the second value specified by the first mapping rule.

In some variations, the one or more categories may include a deployment environment, a cost center, an application, a compliance requirement, an owner, a contact person, a team, a budget, and/or an optimization schedule.

In some variations, the method may further include: receiving, from a client, a request to update the first value to the first tag to the second value, the first value of the first tag being updated to the second value in response to a change to a product including the first cloud resource and/or the first cloud resource being reconfigured for a different consumer; and responding to the request by at least modifying the first mapping rule.

In another aspect, there is provided a computer program product that includes a non-transitory computer readable medium. The non-transitory computer readable medium may store instructions that cause operations when executed by at least one data processor. The operations may include: querying a metadata data store to retrieve first mapping rule corresponding to a first tag associated with a first resource from a first cloud service provider, the first tag assigning the first resource to one or more categories; determining whether a first value of the first tag matches a second value specified by the first mapping rule; and in response to determining that the first value of the first tag does not match the second value specified by the first mapping rule, update the first value of the tag to match the second value specified by the first mapping rule.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to updating resource tags across multiple cloud computing environments, it should be readily understood that such features are not intended to be limiting. The claims that follow this disclosure are intended to define the scope of the protected subject matter.

DESCRIPTION OF DRAWINGS

FIG. 2 depicts an example of data to retrieve a mapping rule from a metadata data store, in accordance with some example embodiments;

When practical, like reference symbols in the various drawings indicate like elements.

DETAILED DESCRIPTION

Figure 1:
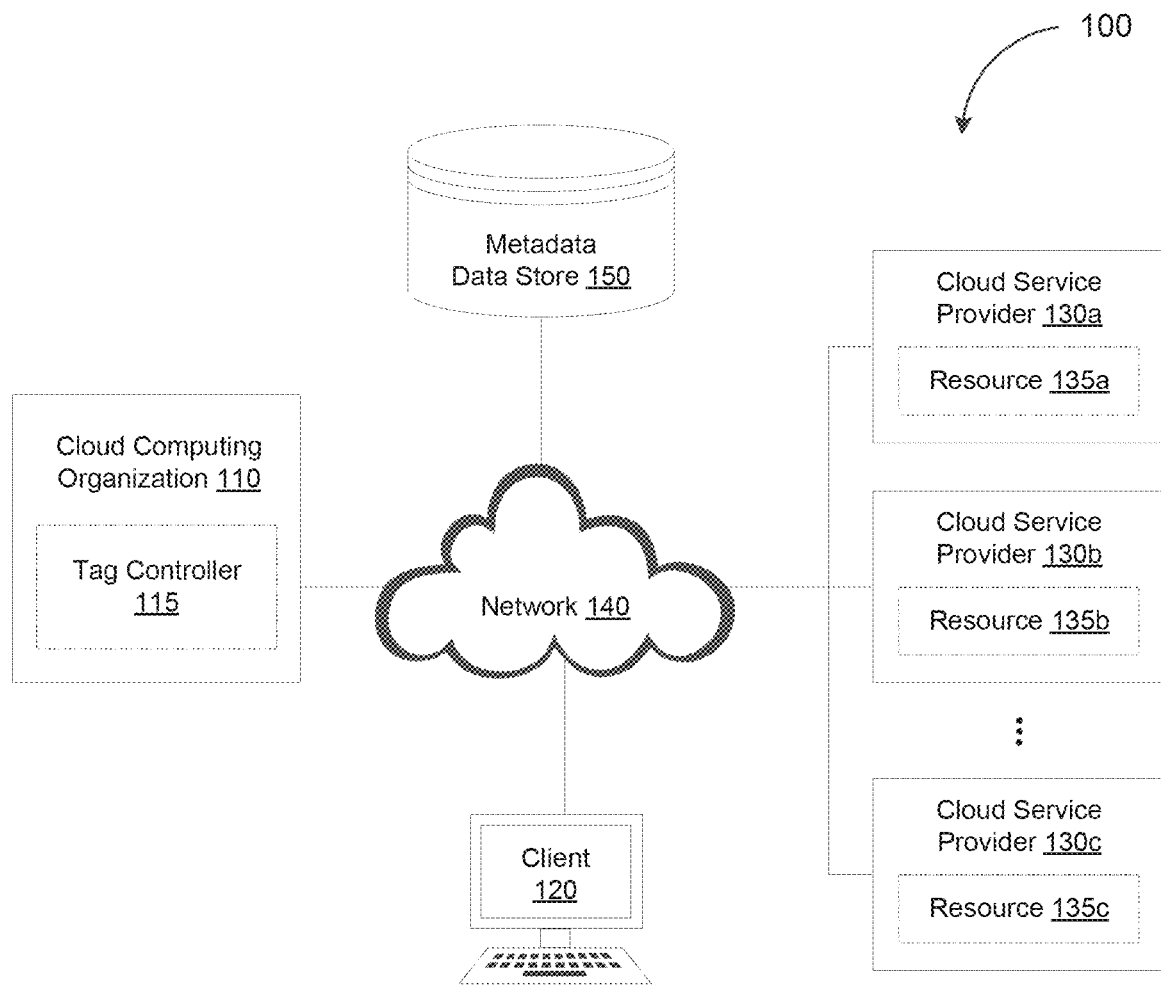
FIG. 1 depicts a system diagram illustrating an example of a cloud computing system, in accordance with some example embodiments.

Cloud providers can provide a remote computing environment, for example, with virtual machine (VM) infrastructure such as a hypervisor using native execution to share and manage hardware, allowing for multiple cloud computing environments which are isolated from one another, yet exist on the same physical machine. The computing environment can include an infrastructure as a service (IaaS) platform that provides application programming interfaces (APIs) to dereference low-level details of underlying network infrastructure. In such an infrastructure as a service platform, pools of hypervisors can support large numbers of virtual machines and include the ability to scale up and down services to meet varying needs. Infrastructure as a service platforms can provide the capability to the user to provision processing, storage, networks, and other fundamental computing resources where the user is able to deploy and run arbitrary software, which can include operating systems and applications. The user may not manage or control the underlying cloud infrastructure but has control over operating systems, storage, and deployed applications; and possibly limited control of select networking components (e.g., host firewalls).

Cloud resource costs vary based on utilization of the underlying computing resource such as the required percent of central processing unit (CPU) processing time. Prior to deployment of a resource, such as a virtual machine, storage accounts, web applications, databases, virtual networks, and the like, the consumer of the resource can request a quantity of resources for a given time period. For example, the consumer may request a quantity of physical central processing unit utilization as well as a number of virtual machines. The cloud provider will then charge a pre-negotiated price for allocating such resources. A cloud computing organization may provide, to each of the organization's many consumers, cloud resources from multiple cloud resource providers (e.g., Amazon Web Services (AWS), Microsoft Azure, Google Cloud Platform (GCP), and the like). For example, the cloud computing organization may provide a variety of products, each of which including a variety of cloud resources from multiple cloud resource providers. In doing so, the cloud computing organization may incur costs corresponding to the pre-negotiated price for each cloud resource.

As the cloud computing organization grows to scale, however, the consumption of cloud resources and the concomitant costs may become exponentially difficult to track back to each consumer. For example, each cloud resource may be associated with one or more tags (e.g., metadata labels) that assign each cloud resource to one or more categories such as deployment environment (e.g., development, testing, staging, production, and/or the like), cost center, application, compliance requirements, owner, contact person, team, budget, and optimization schedule. Although the tags may enable tracking of cloud resources used for specific purposes as well as aggregation, reporting, and bulk handling of multiple cloud resources, the value of the tags are not subject to dynamic updates. For instance, when a product including multiple cloud resources changes or becomes available in a bundle along with other products, the values of the tags associated with the cloud resources may not undergo a corresponding update. Likewise, the value of a tag associated with a cloud resource configured for a first consumer may not be updated when the cloud resource is reconfigured for a second consumer.

Failure to dynamically update the value of a tag associated with a cloud resource may prevent an accurate tracking of the consumption of the cloud resource as well as the budget associated with the cloud resource. As such, in some example embodiments, a tag controller may be configured to apply dynamic updates to one or more tags such that the values of the tags associated with the cloud resources within the scope of the update are consistent with the current mapping rules defining the categories associated with each cloud resource. For example, the scope of the update may be defined by a synchronization profile to encompass one or more individual resources, groups of resources, subscriptions (e.g., of resources belonging to individual consumers), and/or the like. Accordingly, the tag controller may, on a periodic basis, compare the values of the tags to the mapping rules to determine whether the values of each tag matches the values specified by the mapping rules. The tag controller may be configured to interface with each cloud service provider directly, for example, via the corresponding application programming interfaces (APIs), in order to update tags whose values do not match the mapping rules.

FIG. 1 depicts a system diagram illustrating an example of a cloud computing system 100, in accordance with some example embodiments. Referring to claim 1, the cloud computing system 100 includes a cloud computing organization 110, a client 120, and one or more cloud service providers 130. As shown in FIG. 1, the cloud computing organization 110, the client 120, and the one or more cloud service providers 130 may be communicatively coupled via a network 140. The network 140 may be a wired network and/or a wireless network including, for example, a local area network (LAN), a virtual local area network (VLAN), a wide area network (WAN), a public land mobile network (PLMN), the Internet, and/or the like. The client 120 may be a processor-based device including, for example, a smartphone, a personal computer, a tablet computer, a wearable apparatus, an Internet-of-Things (IoT) appliance, and/or the like.

Referring again to FIG. 1, the one or more cloud service providers 130 may provide one or more resources 135 including, for example, computer networks, server, data storage, software applications, services, and/or the like. For example, as shown in FIG. 1, a first cloud service provider 130a may provide a first resource 135a, a second cloud service provider 130b may provide a second resource 135b, and a third cloud service provider 130c may provide a third resource 135c. In some example embodiments, the cloud computing organization 110 may provide, to one or more consumers, cloud resources from the one or more cloud service providers 130. For instance, the cloud computing organization 110 may provide, to each consumer, one or more products including the first resource 135a from the first cloud service provider 130a, the second resource 135b from the second cloud service provider 130b, and/or the third resource 135c from the third cloud service provider 130c.

In providing the one or more resources 135 from the one or more cloud service providers 130, the cloud computing organization 110 may incur costs corresponding to the pre-negotiated price for each of the one or more resources 135. To track the consumption of the resources 135 to each consumer, each of the resources 135 may be associated with one or more tags. As used herein, a "tag" may refer to a metadata label assigning a resource to one or more categories such as deployment environment (e.g., development, testing, staging, production, and/or the like), cost center, application, compliance requirements, owner, contact person, team, budget, and optimization schedule. Associating the one or more resources 135 with tags may enable the tracking of resources used for specific purposes as well as aggregation, reporting, and bulk handling of multiple resources.

In some example embodiments, the cloud computing organization 110 may include a tag controller 115 configured to update the tags associated with the one or more resources 135. For examples, the tag controller 115 may update the values of the tags associated with the one or more resources 135 when a product including the first resource 135a, the second resource 135b, and/or the third resource 135c changes or becomes available in a bundle along with other products. Alternatively and/or additionally, the tag controller 115 may update the value of the tags associated with the one or more resources 135 when the first resource 135a, the second resource 135b, and/or the third resource 135c are reconfigured for a different consumer.

In some example embodiments, the tag controller 115 may update the values of the tags that are associated with the resources that are within the scope of an update. For example, the scope of the update may encompass one or more individual resources, groups of resources, subscriptions (e.g., of resources belonging to individual consumers), and/or the like. In accordance with the scope of the update, the tag controller 115 may, on a periodic basis, compare the values of the tags associated with the one or more resources 135 to one or more mapping rules stored in a metadata data store 150 to determine whether the values of each tag matches the values the specified by the mapping rules. The tag controller 115 may be configured to interface with each cloud service provider 130 directly, for example, via the corresponding application programming interfaces (APIs), in order to update tags whose values do not match the mapping rules stored in the metadata data store 150.

The one or more mapping rules stored in the metadata data store 150 may define the values of the tags associated with the one or more resources 135. For example, one or more mapping rules in the metadata data store 150 may define the cost centers and/or owners that are associated with a product including the one or more resources 135. To further illustrate, Table 1 below depicts an example of metadata data stored in the metadata data store 150. As shown in Table 1, the metadata data store 150 may store metadata corresponding to one or more mapping rules mapping, for example, a tag to its corresponding values.

TABLE 1

```
{
    "Name": "AWS-411570889952-894805286526",
    "AccountId": "411570889952",
    "Cost_Center": "10012",
    "Environment": "Production",
    "Owner": "cloudPlatform@acme.com",
    "SecondaryOwner": "John.Smith@acme.com",
    "SubaccountId": "894805286526",
    "Team": " Cloud Ops (894805286526)",
    "cloudprovider": "AWS",
    "AccountingType": "COGS & Selling Expenses",
    "Product": "Acme Cloud Platform",
    "TeamL1": "Engineering",
},
```

FIG. 2 depicts an example of data to retrieve a mapping rule from the metadata data store 150, in accordance with some example embodiments. Referring to FIG. 2, a query may be executed in order to retrieve, from the metadata data store 150, a mapping rule indicating a value for the tag "CostCenter" at an account level. For example, as shown in FIG. 2, the query may be the stored procedure "csp_GetAccountTagMap." The stored procedure "csp_GetAccountTagMap" may be stored at the metadata data store 150. Moreover, the stored procedure "csp_GetAccountTagMap" may be invoked such that the one or more database statements may be executed to retrieve, from the metadata data store 150, the value of the tag "CostCenter" at the account level. For example, the value for the tag "CostCenter" may be retrieved from the column "Cost_Center" in a database table stored in the metadata data store 150.

Table 2 below depicts an example of programming code implementing the stored procedure "csp_GetAccountTagMap."

TABLE 2

```
CREATE PROCEDURE [dbo].[csp_GetAccountTagMap]
    @Platform varcar(32),
    @AccountID varchar(255),
    @SubAccountID varchar(255)
AS
BEGIN
    Select *
    from [dbo].[MasterCloudAccount]
    where       [Platform] = @Platform
        AND [AccountId] = @AccountID
        AND [SubAccountID] = @SubAccountID
END
```

In some example embodiments, the stored procedure "csp_GetAccountTagMap" may be executed in order to update the values of tags that are within a scope defined by a synchronization profile. For example, the synchronization profile may define the scope of the update to include tags associated with one or more individual resources, groups of resources, subscriptions (e.g., of resources belonging to individual consumers), and/or the like. Table 3 below depicts one example of a synchronization profile defining the scope of the update to include the tags for resources that are associated with a subaccount "894805286526" of an account "411570889952" from the cloud service provider "AWS."

TABLE 3

```
{
    "Operation": "GenerateAndUpdateTags",
    "AccountID": "411570889952",
    "Scope": "894805286526",
    "Provider": "AWS",
},
```

Table 4 depicts another example of a synchronization profile that defines the scope of the update to include tags for resources from the cloud resource provider "AWS" that are part of the product ""Acme Cloud Platform" deployed in a "Production" environment.

TABLE 4

```
{
    "Operation": "GenerateAndUpdateTags",
    "AccountID": "411570889952",
    "Environment": "Production",
    "Product": "Acme Cloud Platform",
    "Provider": "AWS",
},
```

Figure 3:
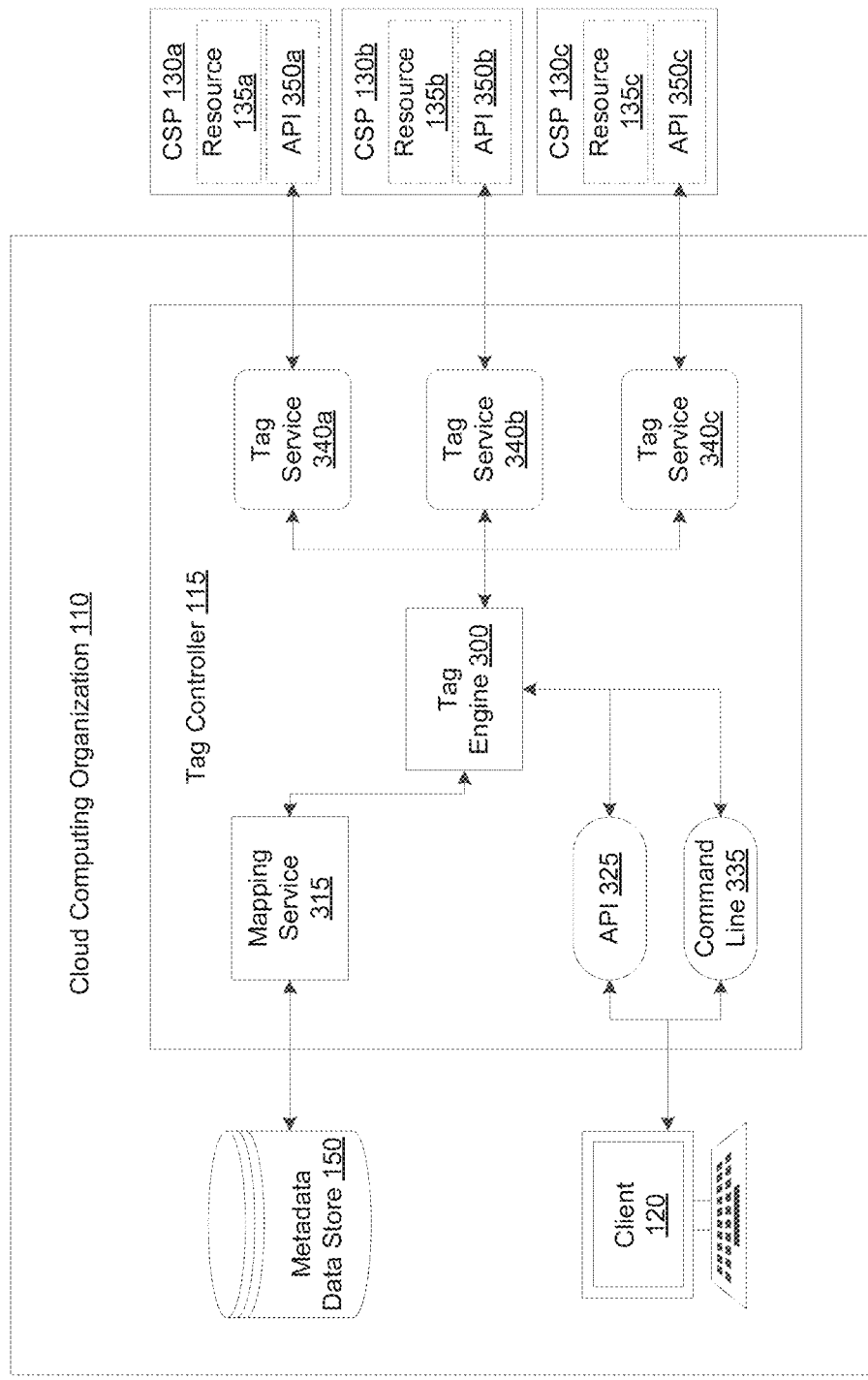
FIG. 3 depicts an example of interactions within a cloud computing system, in accordance with some example embodiments.

FIG. 3 depicts an example of interactions within the cloud computing system 100, in accordance with some example embodiments. Referring to FIGS. 1-3, the tag controller 115 may include a tag engine 300, a mapping service 315, an application programming interface 325, and a command line 335. As shown in FIG. 3, the tag engine 300 may interact with the metadata data store 150, for example, to retrieve one or more mapping rules, by calling the mapping service 315. The tag engine 300 may also interact with the client 120 via the application programming interface 325 and/or the command line 335. Although not shown in FIG. 3, it should be appreciated that an automated service may also trigger one or more calls via the application programming interface 325 to interact with the tag engine 300.

Figure 4:
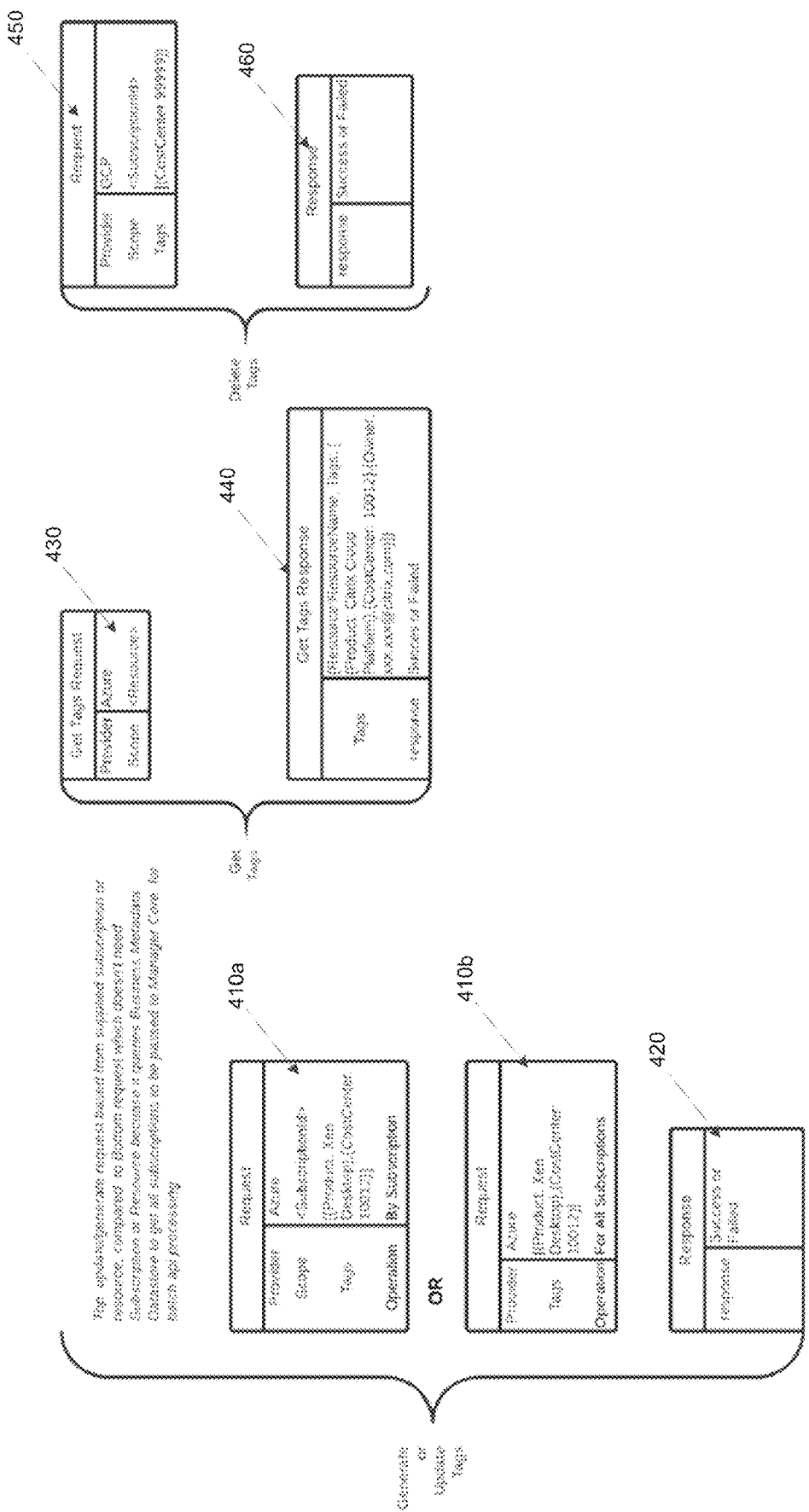
FIG. 4 depicts various examples of request to retrieve, generate, update, and delete one or more tags, in accordance with some example embodiments.

The client 120 may interact, via the application programming interface 325 and/or the command line 335, with the tag engine 300 in order to retrieve, generate, update, and/or delete one or more tags. In doing so, the client 120 may modify the corresponding mapping rules stored in the metadata data store 150. FIG. 4 depicts various examples of request to retrieve, generate, update, and delete one or more tags. The tag engine 300 may respond to these requests by generating, updating, retrieving, and/or deleting, for example, the tags associated with the one or more resources. For example, as shown in FIG. 3, the tag engine 300 may update the mapping rules stored in the metadata data store 150 by at least calling the mapping service 315.

Referring again to FIG. 4, the client 120 may send, to the tag engine 300, a first request 410a and/or a second request 410b to generate or update one or more tags and receive, from the tag engine 300, a first response 420 indicating a success or failure of the first request 410a and/or the second request 410b. Alternatively and/or additionally, the client 120 may send, to the tag engine 300, a third request 430 to retrieve a tag and receive, from the tag engine 300, a second respond 440 including the requested tag. As shown in FIG. 4, the client 120 may further send, to the tag engine 300, a fourth request 450 to delete a tag and receive, from the tag engine 300, a third response 460 indicating a success or failure of the fourth request 450 to delete the tag.

In some example embodiments, the tag engine 300 may further update the tags associated with one or more resources 135 provided by the cloud service providers 130. The tag engine 300 may perform these updates periodically. Moreover, the tag engine 300 may perform these updates, based on the scope defined in a synchronization profile, to include tags associated with one or more individual resources, groups of resources, subscriptions (e.g., of resources belonging to individual consumers), and/or the like. The tag engine 300 may update the value of one or more tags within the scope of the update by at least querying the metadata data store 150. For example, as noted, the metadata data store 150 may be queried by invoking a stored procedure, which may include one or more database statements configured to retrieve, from the metadata data store 150, the value of one or more tags within the scope of the update.

In some example embodiments, the tag engine 300 may update the tags that are within the scope of the update by at least iterating through the tags to compare the value of each tag to a value specified by a corresponding mapping rule. For example, the tag engine 300 may compare the values of the tags to the mapping rules retrieved from the metadata data store 150 to determine whether the values of each tag matches the values specified by the mapping rules. The tag engine 300 may further interface with each cloud service provider 130 directly, for example, via the corresponding application programming interfaces 350, in order to update tags whose values do not match the mapping rules.

For instance, FIG. 3 shows that the tag controller 115 may include one or more tag services 340 interfacing with the corresponding application programming interfaces 350 of the cloud service providers 130. Accordingly, to update a tag associated with the first resource 135a provided by the first cloud service provider 130a, the tag engine 300 may call a first tag service 340a, which interacts with the first cloud service provider 130a via a first application programing interface 350a to update the tag. Alternatively and/or additionally, the tag engine 300 may call a second tag service 340b, which interacts with the second cloud service provider 130b via a second application programming interface 350b, in order to update a tag associated with the second resource 135b provided by the second cloud service provider 130b.

Figure 6:
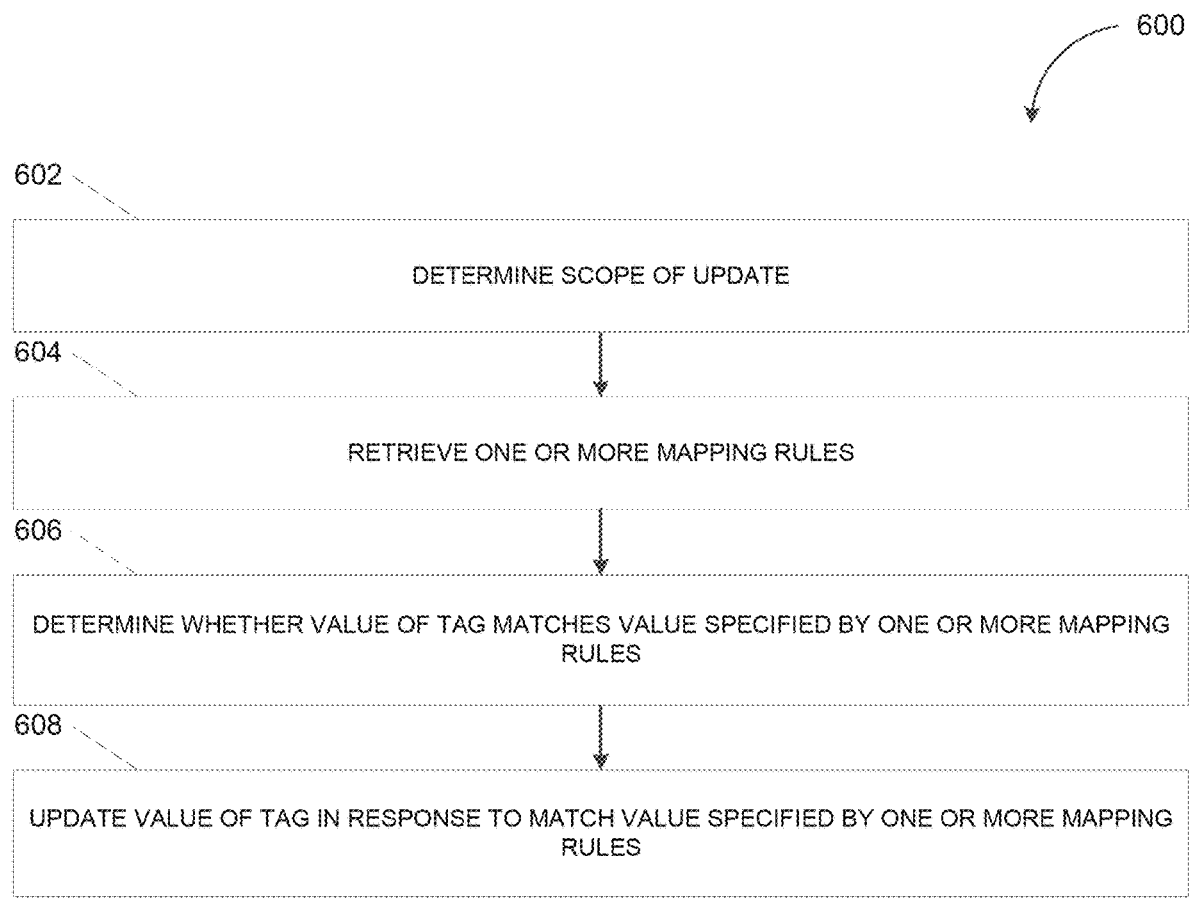
FIG. 6 depicts a flowchart illustrating an example of a process for updating one or more cloud resource tags, in accordance with some example embodiments.

FIG. 6 depicts a flowchart illustrating an example of a process 600 for updating one or more cloud resource tags, in accordance with some example embodiments. Referring to FIGS. 1, 3, and 6, the process 600 may be performed by the tag controller 115 to update, for example, the tags associated with the first resource 135a from the first cloud service provider 130a, the second resource 135b from the second cloud service provider 130b, and/or the third resource 135c from the third cloud service provider 130c.

At 602, the tag controller 115 may determine the scope of an update. In some example embodiments, the tag controller 115 may determine, based at least on a synchronization profile, the scope of an update. The synchronization profile may define the scope of an update to encompass one or more individual resources, groups of resources, subscriptions (e.g., of resources belonging to individual consumers), and/or the like. One example of a synchronization profile shown in Table 3 may define the scope of the update to include the tags for resources that are associated with a subaccount "894805286526" of an account "411570889952" from the cloud service provider "AWS." Alternatively, another example of a synchronization profile shown in Table 4 may define the scope of the update to include tags for resources from the cloud resource provider "AWS" that are part of the product ""Acme Cloud Platform" deployed in a "Production" environment.

At 604, the tag controller 115 may retrieve one or more mapping rules. In some example embodiments, the tag controller 115 may query the metadata data store 150 to retrieve one or more mapping rules corresponding to a tag associated with a resource within the scope of the update. For example, to retrieve a mapping rule indicating a value for a tag "CostCenter" at an account level, the tag controller 115 may execute the stored procedure "csp_GetAccountTagMap" shown in Table 2. The stored procedure "csp_GetAccountTagMap" may be stored at the metadata data store 150. Moreover, invoking the stored procedure "csp_GetAccountTagMap" may execute one or more database statements forming the stored procedure to retrieve, from the metadata data store 150, the value of the tag "CostCenter" at the account level. For instance, the value for the tag "CostCenter" may be retrieved from the column "Cost_Center" in a database table stored in the metadata data store 150.

At 606, the tag controller 115 may determine whether the value of the tag matches the value specified by the one or more mapping rules. In some example embodiments, the tag controller 115 may interact with an application programming interface of a cloud service provider of the resource to determine whether the value of the tag matches the value specified by the one or more mapping rules. For example, as shown in FIG. 3, the tag engine 300 may call the first tag service 340a, which may interact with the first cloud service provider 130a via the first application programing interface 350a to determine whether the value of the tag associated with the first resource 135a provided by the first cloud service provider 130a matches the value specified by the corresponding mapping rule retrieved from the metadata data store 150. Alternatively and/or additionally, the tag engine 300 may call the second tag service 340b, which may interact with the second cloud service provider 130b via the second application programming interface 350b to determine whether the value of the tag associated with the second resource 135b provided by the second cloud service provider 130b matches the value specified by the corresponding mapping rule retrieved from the metadata data store 150.

At 608, the tag controller 115 may update the value of the tag to match the value specified by the one or more mapping rules. In some example embodiments, the tag controller 115 may interact with the application programing interface of the cloud service provider of the resource to update the value of the tag in response to determining that the value of the tag does not match the value specified by the one or more mapping rules. For example, referring again to FIG. 3, the tag engine 300 may call the first tag service 340a, which may interact with the first cloud service provider 130a via the first application programing interface 350a to update the value of the tag associated with the first resource 135a provided by the first cloud service provider 130a if the value of the tag does not match the value specified by the corresponding mapping rule retrieved from the metadata data store 150. Alternatively and/or additionally, the tag engine 300 may call the second tag service 340b, which may interact with the second cloud service provider 130b via the second application programming interface 350b to update the value of the tag associated with the second resource 135b provided by the second cloud service provider 130b if the value of the tag does not match the value specified by the corresponding mapping rule retrieved from the metadata data store 150.

Figure 5A:
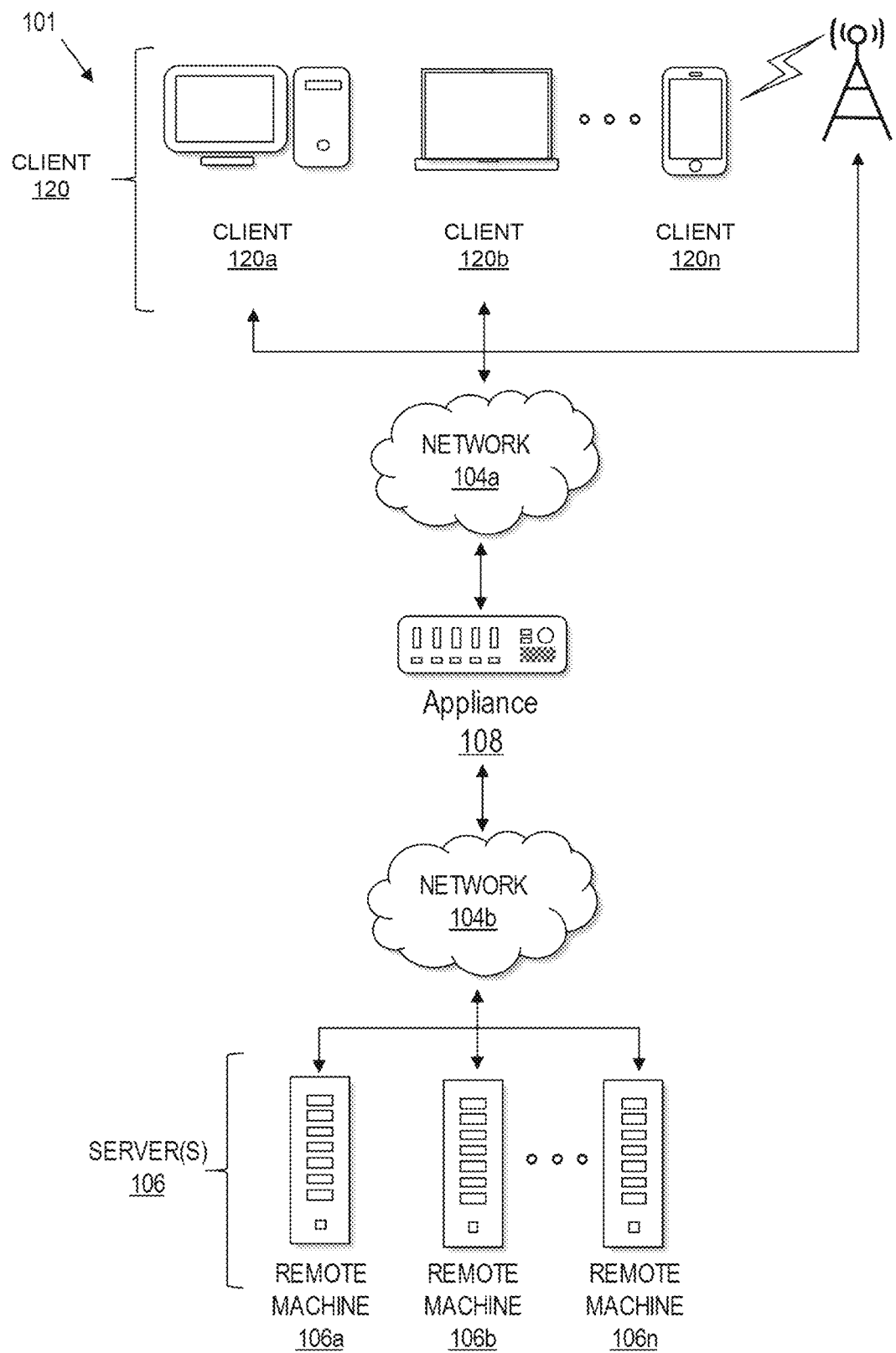
FIG. 5A depicts a network diagram illustrating an example of a network environment, in accordance with some example embodiments.

FIG. 5A depicts a network diagram illustrating an example of a network environment 101, in accordance with some example embodiments. Referring to FIGS. 1 and 5A, the network environment 101 in which various aspects of the disclosure may be implemented may include one or more clients 120a-120n, one or more remote machines 106a-106n, one or more networks 104a and 104b, and one or more appliances 108 installed within the network environment 101. The clients 120a-120n communicate with the remote machines 106a-106n via the networks 104a and 104b.

In some example embodiments, the clients 120a-120n may communicate with the remote machines 106a-106n via an appliance 108. The illustrated appliance 108 is positioned between the networks 104a and 104b, and may also be referred to as a network interface or gateway. In some example embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example embodiments, multiple appliances 108 may be used, and the appliance(s) 108 may be deployed as part of the network 104a and/or 104b.

The clients 120a-120n may be generally referred to as client machines, local machines, clients, client nodes, client computers, client devices, computing devices, endpoints, or endpoint nodes. The clients 120a-120n may include, for example, the first client 110a, the second client 110b, and/or the like. The remote machines 106a-106n may be generally referred to as servers or a server farm. In some example embodiments, a client 120 may have the capacity to function as both a client node seeking access to resources provided by a server 106 and as a server 106 providing access to hosted resources for other clients 120a-120n. The networks 104a and 104b may be generally referred to as a network 104. The network 104 including the networks 104a and 104b may be configured in any combination of wired and wireless networks.

The servers 106 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 may include, for example, the tag controller 115 and/or the like.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example embodiments, a server 106 may execute a remote presentation services program or other program that uses a thin-client or a remote-display protocol to capture display output generated by an application executing on a server 106 and transmit the application display output to a client 120.

In yet other example embodiments, a server 106 may execute a virtual machine providing, to a user of a client 120, access to a computing environment. The client 120 may be a virtual machine. The virtual machine may be managed by, for example, a hypervisor, a virtual machine manager (VMM), or any other hardware virtualization technique within the server 106.

In some example embodiments, the network 104 may be a local-area network (LAN), a metropolitan area network (MAN), a wide area network (WAN), a primary public network, and/or a primary private network. Additional embodiments may include one or more mobile telephone networks that use various protocols to communicate among mobile devices. For short-range communications within a wireless local-area network (WLAN), the protocols may include 802.11, Bluetooth, and Near Field Communication (NFC).

Figure 5B:
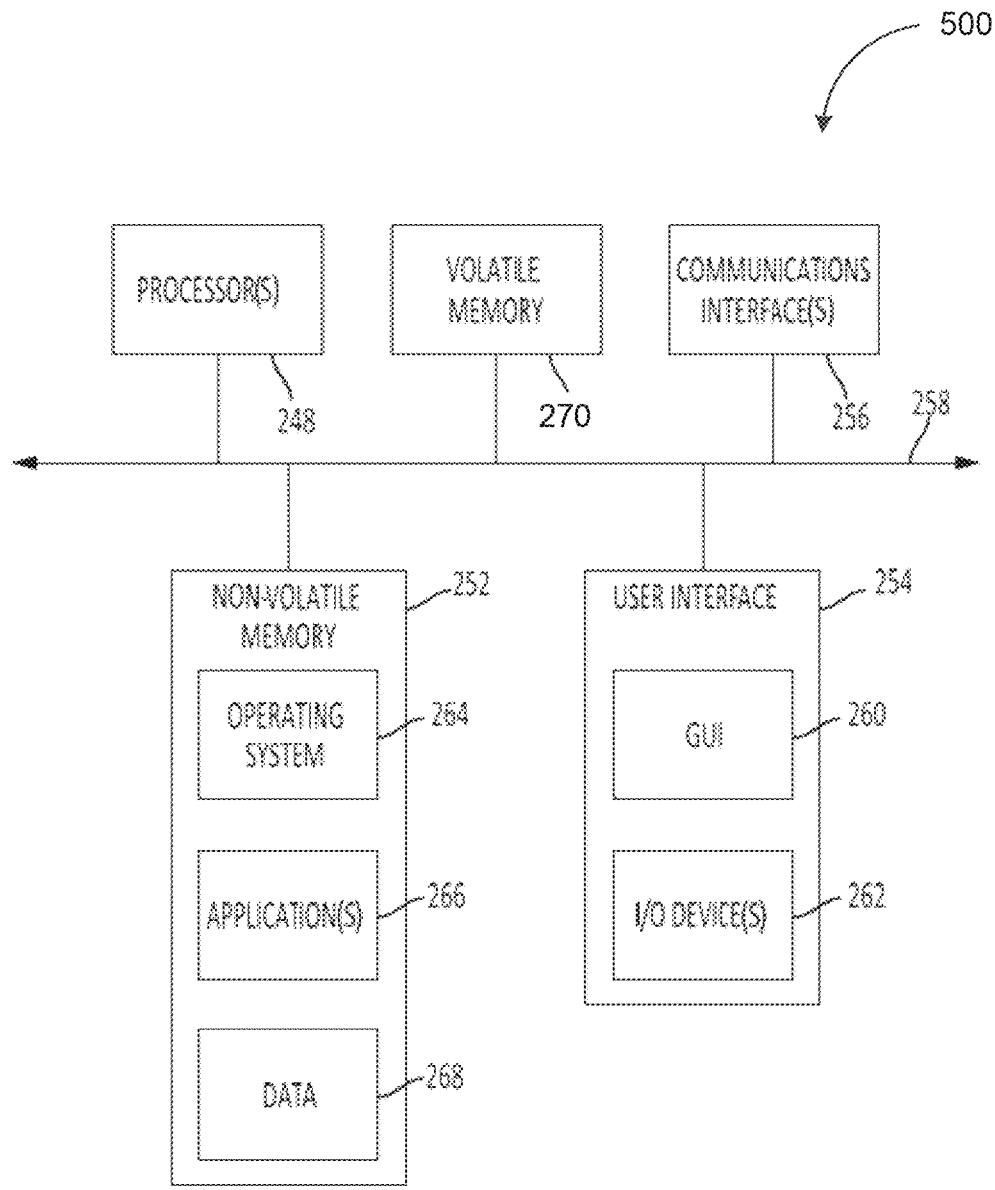
FIG. 5B depicts a block diagram illustrating an example of a computing device, in accordance with some example embodiments.

FIG. 5B depicts a block diagram illustrating an example of a computing device 500, in accordance with some example embodiments. Referring to FIGS. 1 and 5A-B, the computing device 500 may be useful for practicing an embodiment of the tag controller 115 and/or the client 120.

As shown in FIG. 5B, the computing device 500 may include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, and/or the like) and one or more input/output (I/O) devices 262 (e.g., a mouse, a keyboard, and/or the like). The non-volatile memory 252 may store an operating system 264, one or more applications 266, and data 268 such that computer instructions of the operating system 264 and/or applications 266 are executed by the processor(s) 248 out of the volatile memory 270. Data may be entered using an input device of the GUI 260 or received from I/O device(s) 262. Various elements of the computing device 500 may communicate via communication the communication bus 258. The computing device 500 as shown in FIG. 5B is shown merely as an example, as the tag controller 115 and/or the client 120 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example embodiments, the "processor" may be one or more physical processors or one or more "virtual" (e.g., remotely located or "cloud") processors.

The communications interfaces 256 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 may execute an application on behalf of a user of a client computing device (e.g., the clients 120), may execute a virtual machine, which provides an execution session within which applications execute on behalf of a user or a client computing device (e.g., the clients 120), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 5C:
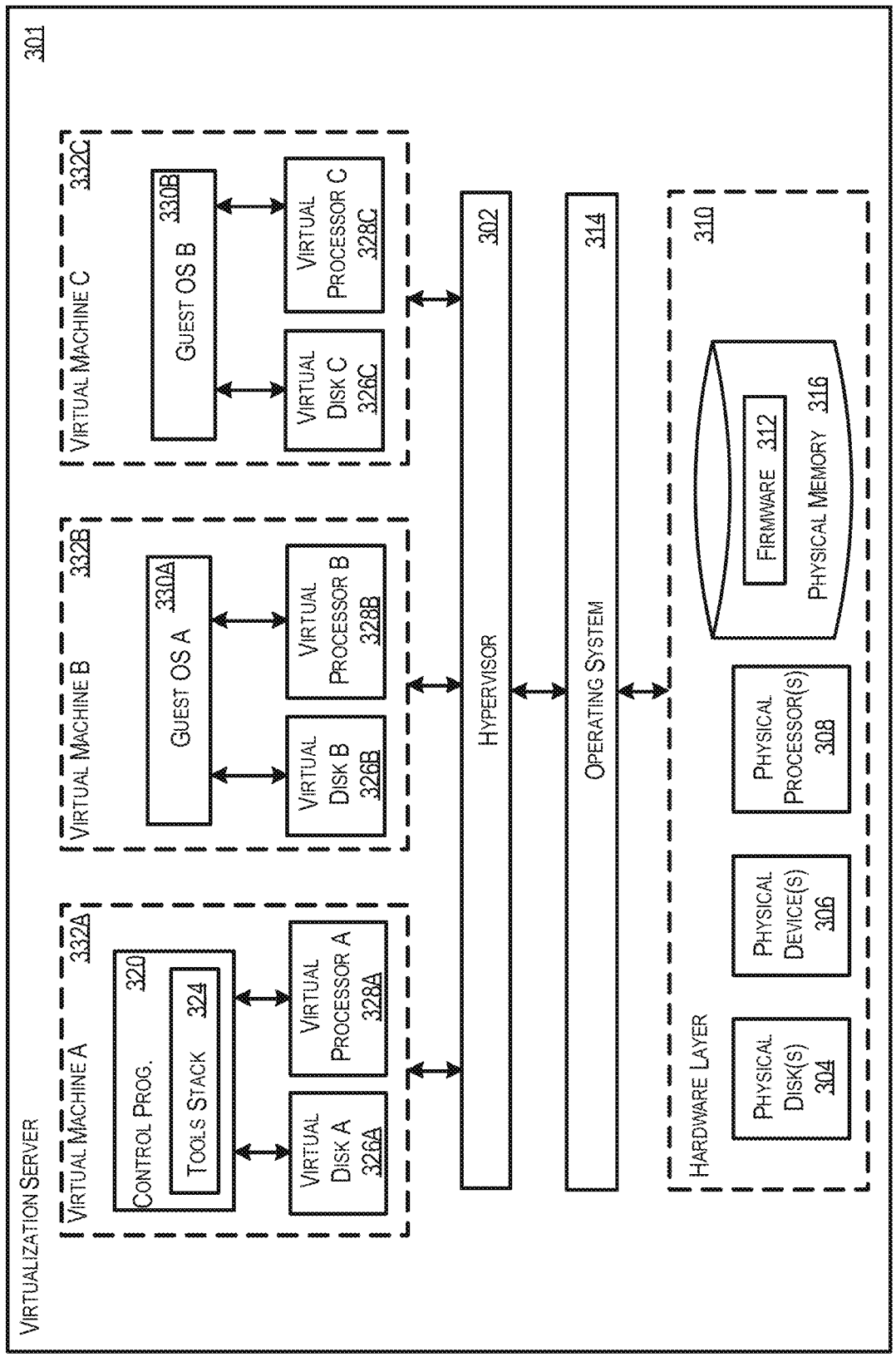
FIG. 5C depicts a high-level architecture of an example of a virtualization system for implementing a cloud computing system, in accordance with some example embodiments.

FIG. 5C depicts a high-level architecture of an example of a virtualization system for implementing the cloud computing system 100, in accordance with some example embodiments. As shown in FIG. 5C, the virtualization system may be a single-server or multi-server system, or a cloud system, including at least one virtualization server 301 configured to provide virtual desktops and/or virtual applications to one or more client access devices 120a-c. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 illustrated in FIG. 5C may be deployed as and/or implemented by one or more embodiments of server 106 illustrated in FIG. 5A or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332). Each virtual machine 332 may have virtual disk 326A-C and virtual processor 328A-C. In some embodiments, first virtual machine 332A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 332B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 5C illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. The virtualization server 301 may execute hypervisor 302 that creates a virtual machine platform on which guest operating systems 330 may execute. When this is the case, virtualization server 301 may be referred to as a host server. An example of such a virtualization server is Citrix Hypervisor® provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 330 within virtual machine 332. In still other embodiments, virtual machine 332 may execute guest operating system 330.

In addition to creating virtual machines 332, hypervisor 302 may control the execution of at least one virtual machine 332. The hypervisor 302 may present at least one virtual machine 332 with an abstraction of at least one hardware resource provided by virtualization server 301 (e.g., any hardware resource available within hardware layer 310). In some implementations, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

As shown in FIG. 5C, the virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While FIG. 5C illustrates an embodiment where virtualization server 301 hosts three virtual machines 332, in other embodiments virtualization server 301 may host any number of virtual machines 332. Hypervisor 302 may provide each virtual machine 332 with a unique virtual view of the physical hardware, including memory 316, processor 308, and other system resources 304, 306 available to that virtual machine 332. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326 may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. These particular virtual disk 326 (included in each virtual machine 332) may be unique, when compared with other virtual disks 326.

Virtual processor 328 may be a virtualized view of one or more physical processors 308 of virtualization server 301. The virtualized view of physical processors 308 may be generated, provided, and managed by hypervisor 302. Virtual processor 328 may have substantially all of the same characteristics of at least one physical processor 308. Virtual processor 308 may provide a modified view of physical processors 308 such that at least some of the characteristics of virtual processor 328 are different from the characteristics of the corresponding physical processor 308.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
at least one data processor; and
at least one memory storing instructions, which when executed by the at least one data processor, result in operations comprising:
detecting a change in a configuration of a first resource from a first cloud service provider, the change affecting at least a quantity of the first resource utilized by a first consumer;
in response to detecting the change in the configuration of the first resource, querying a metadata data store to retrieve a first mapping rule corresponding to a first tag associated with the first resource, the first tag attributing a utilization of the first resource to a first consumer by at least assigning the first resource to one or more categories;
determining whether a first value of the first tag matches a second value specified by the first mapping rule;
in response to determining that the first value of the first tag does not match the second value specified by the first mapping rule, updating the first value of the tag to match the second value specified by the first mapping rule; and
determining, based at least on the second value of the first tag, the quantity of the first resource utilized by the first consumer.

2. The system of claim 1, wherein the operations further comprise:
determining, based at least on a synchronization profile, a scope of an update; and
querying the metadata data store to retrieve the first mapping rule and a second mapping rule within the scope of the update.

3. The system of claim 2, wherein the synchronization profile defines the scope of the update to include one or more tags associated with one or more cloud resources, groups of resources, and/or subscriptions.

4. The system of claim 2, wherein the operations further comprise:
determining whether a third value of a second tag matches a fourth value specified by the second mapping rule, the second tag associated with a second resource from the first cloud service provider or a second cloud service provider, the second tag attributing a utilization of the second resource to the second resource to the first consumer and/or a second consumer; and
in response to determining that the third value of the second tag does not match the fourth value specified by the second mapping rule, updating the third value of the second tag to match the fourth value specified by the second mapping rule.

5. The system of claim 1, wherein the operations further comprise:
tracking, based at least on a price of the first resource and the quantity of the first resource utilized by the first consumer, a cost associated with providing the first resource to the first consumer.

6. The system of claim 1, wherein the operations further comprise:
interacting with an application programming interface (API) of the first cloud service provider to determine whether the first value of the first tag matches the second value specified by the first mapping rule.

7. The system of claim 1, wherein the operations further comprise:
interacting with an application programming interface (API) of the first cloud service provider to update the first value of the first tag to match the second value specified by the first mapping rule.

8. The system of claim 1, wherein the one or more categories include a deployment environment, a cost center, an application, a compliance requirement, an owner, a contact person, a team, a budget, and/or an optimization schedule.

9. The system of claim 1, wherein the operations further comprise:
receiving, from a client device, a request to update the first value to the first tag to the second value; and
responding to the request by at least modifying the first mapping rule.

10. The system of claim 1, wherein the change in the configuration of the first resource includes a change to a product including the first resource and a second resource from the first cloud service provider or a second cloud service provider.

11. The system of claim 1, wherein the change in the configuration of the first resource includes a reconfiguration of the first resource for a different consumer.

12. The system of claim 1, wherein the metadata data store is queried by at least executing a stored procedure, wherein the stored procedure is stored at the metadata data store, and wherein the stored procedure includes one or more database statements configured to retrieve, from the metadata data store, the second value specified by the first mapping rule corresponding to the first tag.

13. The system of claim 1, wherein the quantity of the first resource utilized by the first consumer includes a percentage of the first resource allocated to the first consumer over a given period of time.

14. A computer-implemented method, comprising:
- detecting a change in a configuration of a first resource from a first cloud service provider, the change affecting at least a quantity of the first resource utilized by a first consumer;
- in response to detecting the change in the configuration of the first resource, querying a metadata data store to retrieve a first mapping rule corresponding to a first tag associated with the first resource, the first tag attributing a utilization of the first resource to the first consumer by at least assigning the first resource to one or more categories;
- determining whether a first value of the first tag matches a second value specified by the first mapping rule;
- in response to determining that the first value of the first tag does not match the second value specified by the first mapping rule, updating the first value of the tag to match the second value specified by the first mapping rule; and
- determining, based at least on the second value of the first tag, the quantity of the first resource utilized by the first consumer.

15. The method of claim 14, further comprising:
- determining, based at least on a synchronization profile, a scope of an update, the synchronization profile defining the scope of the update to include one or more tags associated with one or more cloud resources, groups of resources, and/or subscriptions; and
- querying the metadata data store to retrieve the first mapping rule and a second mapping rule within the scope of the update.

16. The method of claim 15, further comprising:
- determining whether a third value of a second tag matches a fourth value specified by the second mapping rule, the second tag associated with a second resource from the first cloud service provider or a second cloud service provider, the second tag attributing a utilization of the second resource to the second resource to the first consumer and/or a second consumer; and
- in response to determining that the third value of the second tag does not match the fourth value specified by the second mapping rule, updating the third value of the second tag to match the fourth value specified by the second mapping rule.

17. The method of claim 14, further comprising:
- interacting with an application programming interface (API) of the first cloud service provider to determine whether the first value of the first tag matches the second value specified by the first mapping rule.

18. The method of claim 14, further comprising:
- interacting with an application programming interface (API) of the first cloud service provider to update the first value of the first tag to match the second value specified by the first mapping rule.

19. The method of claim 14, wherein the one or more categories include a deployment environment, a cost center, an application, a compliance requirement, an owner, a contact person, a team, a budget, and/or an optimization schedule.

20. The method of claim 14,
- wherein the change in the configuration of the first resource includes a change to a product including the first resource and a second resource from the first cloud service provider or a second cloud service provider, and/or a reconfiguration of the first resource for a different consumer.

21. A non-transitory computer readable medium storing instructions, which when executed by at least one data processor, result in operations comprising:
- detecting a change in a configuration of a first resource from a first cloud service provider, the change affecting at least a quantity of the first resource utilized by a first consumer;
- in response to detecting the change in the configuration of the first resource, querying a metadata data store to retrieve a first mapping rule corresponding to a first tag associated with the first resource, the first tag attributing a utilization of the first resource to the first consumer by at least assigning the first resource to one or more categories;
- determining whether a first value of the first tag matches a second value specified by the first mapping rule;
- in response to determining that the first value of the first tag does not match the second value specified by the first mapping rule, updating the first value of the tag to match the second value specified by the first mapping rule; and
- determining, based at least on the second value of the first tag, the quantity of the first resource utilized by the first consumer.

* * * * *